United States Patent [19]

Shichman

[11] 4,254,810
[45] * Mar. 10, 1981

[54] NAIL-DEFLECTING, INNER-TUBE ASSEMBLY FOR RUN-FLAT TIRES

[75] Inventor: Daniel Shichman, Trumbull, Conn.

[73] Assignee: Uniroyal, Inc., New York, N.Y.

[ * ] Notice: The portion of the term of this patent subsequent to Aug. 14, 1996, has been disclaimed.

[21] Appl. No.: 847

[22] Filed: Jan. 3, 1979

Related U.S. Application Data

[63] Continuation of Ser. No. 741,918, Nov. 15, 1976, Pat. No. 4,164,250.

[51] Int. Cl.$^3$ ............................................. B60C 17/00
[52] U.S. Cl. .................................... 152/205; 152/207; 152/349
[58] Field of Search ............................... 152/339–342, 152/349, 350, 205, 207, 330 RF

[56] References Cited

U.S. PATENT DOCUMENTS

| | | | |
|---|---|---|---|
| 1,253,501 | 1/1918 | Lago et al. | 152/205 |
| 1,302,970 | 5/1919 | Pritchett | 152/205 |
| 1,396,200 | 11/1921 | Harvey et al. | 152/207 |
| 2,375,127 | 5/1945 | Mendelsohn | 152/339 |

Primary Examiner—John J. Love
Assistant Examiner—D. W. Underwood
Attorney, Agent, or Firm—Philip Rodman

[57] ABSTRACT

A pneumatic tire having a "run-flat" capability, is disclosed. The tire is in the form of a substantially toroidally shaped carcass having a pair of bead-reinforced sidewall regions and a crown region annularly bridging the sidewall regions. Internally of the carcass, there is provided an expandable nail-deflector for deflecting a nail that punctures, for example, the crown region. The nail deflector has a releasably constrained normal condition when the crown region is puncture-free that is annularly spaced from the interior of the crown region, and is circumferentially self-expandable into engagement with the interior of the crown region upon puncture of the latter by a nail to deflect such nail harmlessly away from its path of entry.

7 Claims, 10 Drawing Figures

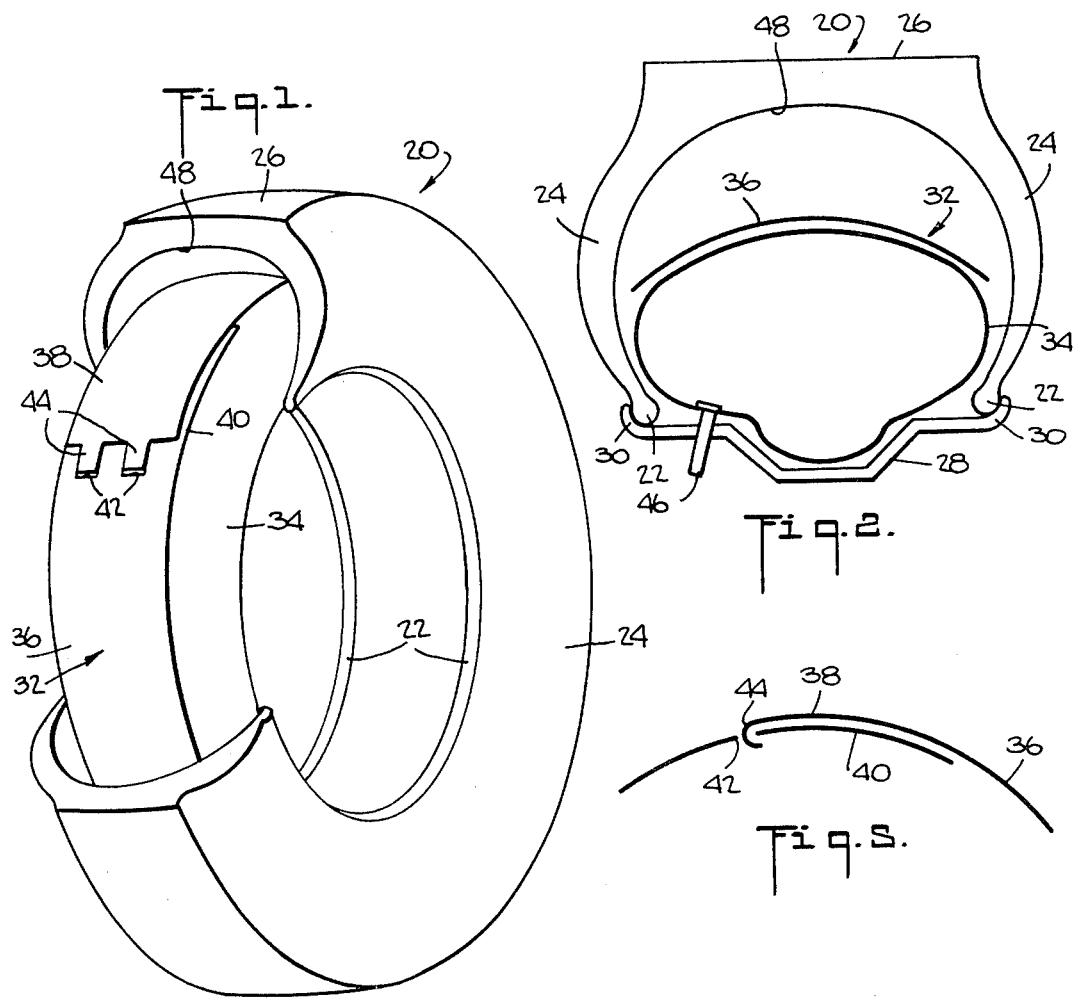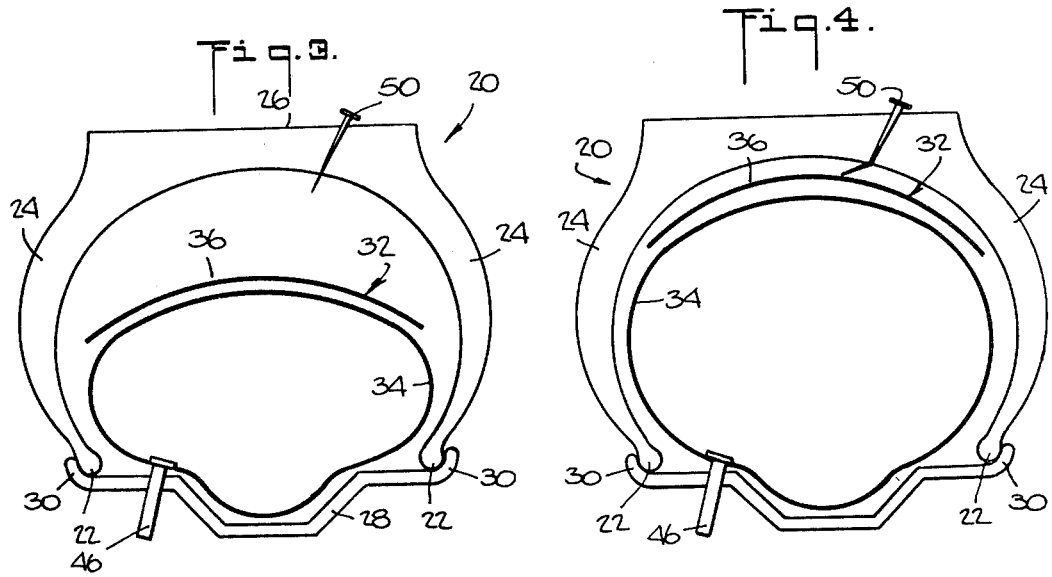

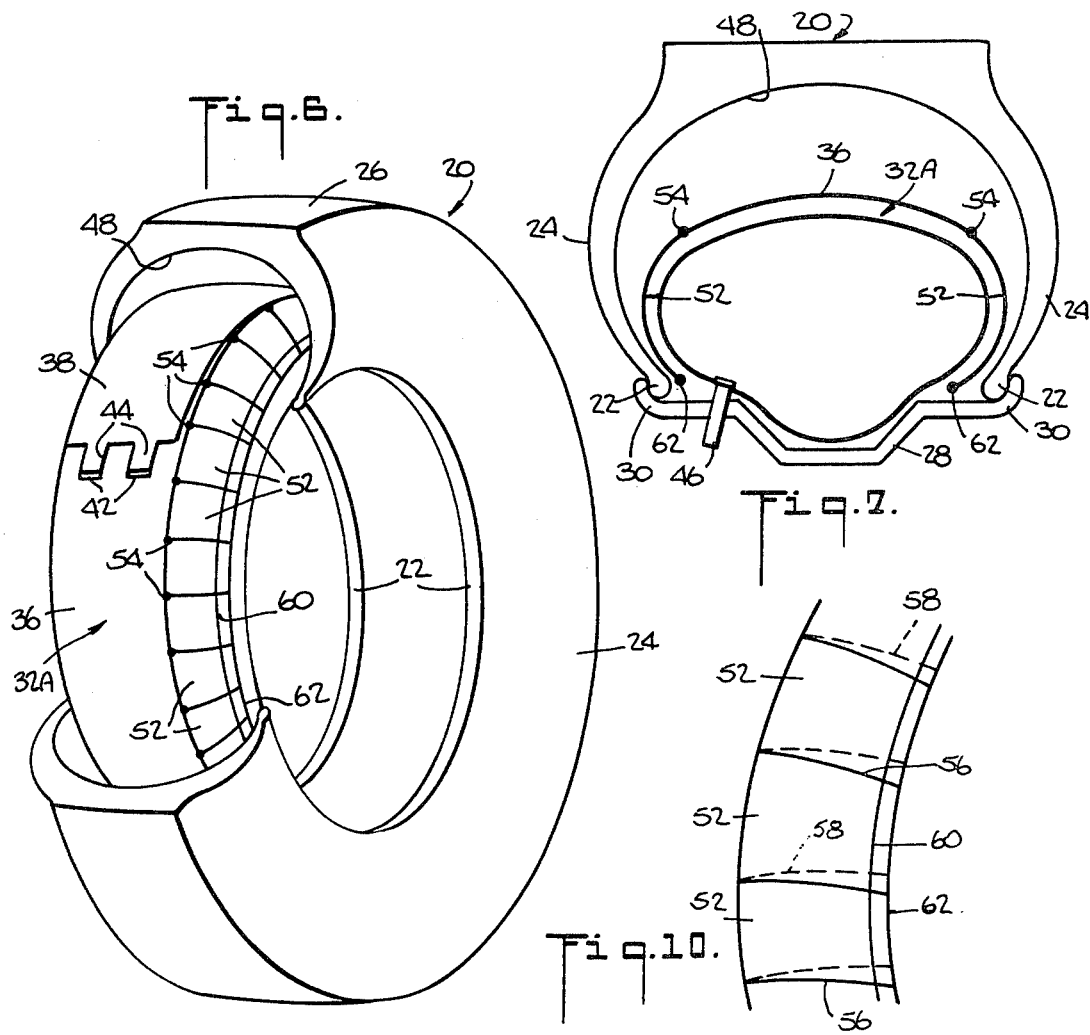
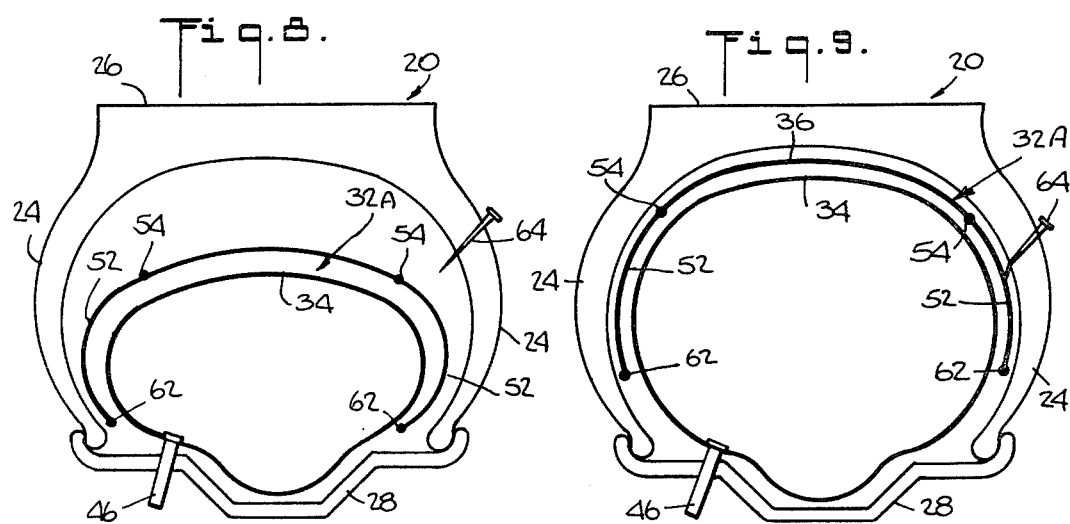

NAIL-DEFLECTING, INNER-TUBE ASSEMBLY FOR RUN-FLAT TIRES

This is a continuation of application Ser. No. 741,918, filed Nov. 15, 1976, now U.S. Pat. No. 4,164,250.

BACKGROUND OF THE INVENTION

The present invention relates generally to pneumatic tires, and more particularly to tires having a "run-flat" capability.

Generally speaking, tires of the "run-flat" variety employ various inner assemblies for supporting the sidewalls at least partially after tread-puncture, and for retaining the bead regions wedged against the annular flanges of the vehicular wheels upon which such tires are mounted. Thus, tires of the "run-flat" variety can be used somewhat effectively over various distances at certain maximum permissible speeds.

A disadvantage associated with conventional "run-flat" tires is that they are utilized at air-pressures, after tread-puncture, which are substantially less than their normal-rated puncture-free inflation pressure, and often at no air-pressure at all. As a result, when such tires are punctured and run flat in a wider, deformed condition, the loads thereon are not properly balanced and pneumatically supported. The components of such tires, such as the sidewalls and tread, are therefore often subjected to extreme stress and wear, and in the wider, deformed condition thereof are likely to be punctured once again, and are likely to fail earlier than desirable after the tire is repaired and run once again in a fully inflated condition.

SUMMARY OF THE INVENTION

Accordingly, it is an object of the present invention to provide a new and improved inner tube assembly for "run-flat" tires that obviates the aforementioned disadvantages.

More particularly, it is an object of the present invention to provide such an inner tube assembly that is designed, upon tread-puncture, to circumferentially self-expand pneumatically and fill the entire inner volume of the tire carcass and, thereby, properly balance and pneumatically support the carcass in a condition of substantial equilibrium.

It is a further object of the present invention to provide such an inner tube assembly that upon its expansion is engageable circumferentially with the inner surface of the carcass crown region and capable of deflecting a tread-puncturing nail harmlessly away from its generally radial path of entry, to thereby prevent the nail-point from causing further damage.

With the above objects in mind, the present invention may be characterized as an inflatable nail-deflector that is releasably constrained in a pressurized, normal condition that is annularly spaced from the interior of the tire crown region. The nail-deflector is circumferentially self-expandable into engagement with the interior of the crown region upon puncture of the latter, such engagement effecting the deflection of any tread-(crown region-) puncturing nail or object of similar shape into a substantially harmless orientation.

BRIEF DESCRIPTION OF THE DRAWINGS

The foregoing and other objects and features of the present invention will be more clearly understood from the following detailed description thereof when read in conjunction with the accompanying drawings, in which:

FIG. 1 is a schematic, perspective view illustrating a tire carcass embodying the present invention, a portion of the carcass being broken away to expose, in part, the inflatable nail-deflector of the present invention:

FIG. 2 is a schematic, cross-sectional view of the tire carcass embodying the present invention in a normal condition;

FIG. 3 is a view similar to FIG. 2, but illustrating a nail or other means penetrating the carcass tread;

FIG. 4 is a view similar to FIG. 3, but illustrating the manner by which the nail-deflector of the present invention inflates upon tread-puncture to engage and deflect the nail penetrating the tread;

FIG. 5 is a fragmentary, enlarged, elevational view of the nail-deflecting band of the present invention;

FIG. 6 is a view similar to FIG. 1, but illustrating an alternate embodiment of the present invention;

FIG. 7 is a view similar to FIG. 2, but illustrating the alternate embodiment of the present invention pursuant to FIG. 6;

FIG. 8 is a view similar to FIG. 3, but illustrating a nail or other means penetrating the sidewall of the tire;

FIG. 9 is a view similar to FIG. 8, but illustrating the manner by which the alternate embodiment of FIG. 6 effects deflection of the nail penetrating the sidewall of the tire; and FIG. 10 is a fragmentary, schematic view illustrating the shingled assembly of the alternate embodiment of FIG. 6.

DETAILED DESCRIPTION OF THE INVENTION

Referring now to the drawings, and more particularly to FIGS. 1 through 5, the present invention relates to a pneumatic tire having what may be characterized conventionally as a "run-flat" capability. The tire is denoted generally by the reference character 20. The tire 20 is formed with a pair of beads 22 which reinforce a pair of sidewall regions 24 that are bridged by a crown-wall tread region 26. The tire 20 may be mounted upon a vehicular wheel 28 having a pair of opposite flanges 30 around which extend, and against which may be detachably anchored, respective ones of the beads 22.

Arranged internally of the tire 20, between the sidewalls 24 thereof, is the nail-deflecting means of the present invention denoted generally by the reference character 32. The nail-deflecting means 32, in the embodiment illustrated in FIGS. 1-5, is provided with an inflatable inner-tube 34 constituted of rubber or other conventional elastomeric material, and a substantially inextensible, preferably metallic, annular band 36 surrounding the tube 34. The band 36, as illustrated in FIGS. 1 and 5, is provided with a pair of overlapping end portions 38 and 40. The end portion 40 is provided with a pair of slots 42 into which may be interfitted, respectively, a pair of tabs 44 formed on the end portion 38. Preferably, the tabs 44 are sufficiently strong to withstand a specified tension, as will be clarified below, before they can be torn free from their respective slots 42 and free the end portions 38 and 40 relative to one another.

Communicating with the interior of the inner-tube 34 is a valve device 46 that is connected to the wheel 28 and is, in a conventional manner, capable of inflating not only the inner-tube 34, but also the interior of the tire 20 simultaneously upon the inflation of the inner-tube 34. The valve device 46 for example, may be of the type that is commonly referred to as "dual-inflation valve" and incorporated in U.S. Pat. No. 3,724,521, issued on Apr. 3, 1973.

With the use of such a valve device 46, the inner-tube 34 and the tire 20 can be simultaneously inflated such that their interiors are each maintained at the same air-pressure, under equilibrium at a pressure, for example, of 15–24 pounds per square inch. As a result, the inner-tube 34 when inflated to fifteen pounds per square inch will assume a configuration as illustrated in FIGS. 2 and 3 in which there is a substantial annular space between the annular band 36 surrounding the inner-tube 34 and the inner crown region 48 of the tire 20.

It will be understood, that the elongate extent of annular band 36, with its overlapping end portions 38 and 40, is selected such that upon inflation of the inner-tube 34 to the configuration and size illustrated in FIGS. 2 and 3 under a pressure of, for example, 15–24 pounds per square inch, the exterior of the inner-tube 34 is engageable with the interior of the annular band 36, but does not exert enough force thereagainst to tear the tabs 44 free from the slots 42. In this regard, it is the pneumatic pressure in the tire carcass 20 externally of, and surrounding, the inner-tube 34 that prevents the inner-tube 34 from expanding circumferentially beyond the circumferential size of the annular band 36.

As illustrated in FIGS. 2–4, the annular band 36 may be provided with an annular concavity that confronts and conforms to the rounded exterior of the inner-tube 34. The concavity of the band 36 may be secured to selected portions of the exterior of the inner-tube 34 by an adhesive or the like so as to remain in at least a releasably fixed condition upon the inner-tube 34 without separating therefrom when the entire assembly of the inner-tube 34 and annular band 36 is first inserted into the pneumatic tire 20 and inflated.

In operation, once the assembly of the inner-tube 34 and the annular band 36 is inserted into the tire 20 in a relatively uninflated condition, both the interior of the tire 20 and the interior of the inner-tube 34 can be together, simultaneously, inflated into a condition as illustrated in FIG. 2, via the valve device 46. In such a condition, the tire 20 can be operated under normal driving conditions without interference from the assembly of the inner-tube 34 and the annular band 36 because of the pressure equilibrium that is maintained within the confines of the tire 20.

However, should a nail, such as the nail 50 illustrated in FIG. 3, puncture the tread and crown region of the tire 20 and, thereby, discharge the air with which the interior of the tire 20 is inflated, the pressure equilibrium in the tire 20 will be destroyed and the inner-tube 34, under its internal pressure of, for example, 15–24 pounds per square inch, will expand circumferentially and tear free the tabs 44 from the slots 42 of the annular band 36. In turn, the annular band 36 will likewise expand circumferentially.

The circumferential expansion of the inner-tube 34 and the annular band 36 will continue until, as illustrated in FIG. 4, the exterior of the annular band 36 engages the pointed, free end portion of the nail 50 and deflects the latter away from its path of penetration through the tread 26. As a result, the punctured tire 20 can continue in service in a substantially near-fully inflated condition of, for example, fifteen pounds per square inch until it can be repaired. Clearly, repair of the tire 20, subsequently, will necessitate deflation of the inner-tube 34, via the valve device 46. It will be understood, that the extent over which the overlapping portions 36 and 38 of the annular band 36 overlap one another is such that they remain in overlapping relation continuously, even when the inner-tube 34 circumferentially expands the annular band 36 into engagement with the interior of the crown region of the tire carcass 20.

Referring now to FIGS. 6–10, the nail-deflecting means 32 of FIGS. 1–5, can be modified somewhat. Such modification is denoted generally by reference character 32A. In this regard, the nail-deflector 32A is comprised of the aforementioned annular band 36 that surrounds the inner-tube 34 and is retained out of contact with the interior of the crown region 48 of the tire carcass 20 by the tabs 44 associated with the slots 42.

However, affixed to either side of the annular band 36 is an interleaved or shingled array of separable segments 52 that are affixed to the annular band 36 such as by welding at the spot welds 54, respectively. The segments 52 are interleaved with one another such that each is provided with a front edge that is exposed and denoted generally by the reference character 56 in FIG. 10, and a rear edge 58 concealed by the front edge 56 of its adjoining one of the segments 52.

Accordingly, upon the circumferential expansion of the inner-tube 34, and in turn the circumferential expansion of the annular band 36, each of the segments 52 are separable from one another at their overlapping or interleaved edged portions. Preferably, as illustrated in FIGS. 6 and 10, a frangible cord 60 may be utilized to detachably interconnect the radially inward free edge portions 62 of the segments 52, respectively, to stabilize such segments 52 against movement relative to one another when the tire carcass 20 is utilized under normal driving conditions. As illustrated in FIG. 7 and 8, each of the segments 52 is provided with an inner concave surface that abuts against, and conforms to, the sidewall exterior of the inner-tube 34 to assist in the stabilization thereof against the inner-tube 34.

In operation, the inner-tube assembly 34 and the annular band 36, with its associated shingled arrays of segments 52, remains in a condition as illustrated in FIG. 7 until, for example, the sidewall 24 of the tire carcass 20 is pierced or punctured by a nail, such as the nail 64. Once the nail 64 penetrates the sidewall 24, the air in the tire carcass 20 surrounding the inner-tube 34 is discharged through the punctured opening, thus destroying the pressure equilibrium.

Once the pressure equilibrium is destroyed, the pressurized medium or air internally of the inner-tube 34 causes the inner-tube 34 to expand circumferentially and tear free the tabs 44 associated with the slots 42 and effect a circumferential expansion of the annular band 36 into engagement with the internal crown region 48 of the tire carcass 20. The circumferential expansion of the inner tube 34 and the annular band 36 is best illustrated in FIG. 9.

Moreover, as the annular band 36 expands circumferentially, the frangible cords 60 associated with the segments 52 tear and free the segments 52 for movement relative to one another. Thus, as the annular band 36 expands into engagement with the internal crown region 48 of the tire carcass 20, the free edge portion 62 of each of the segments 52 move radially outwardly from the condition illustrated in FIGS. 7 and 8 to the condition illustrated in FIG. 9. As the segments 52 to move radially outwardly, they engage the internal sidewall surface of the tire carcass 20. As they engage the interior of the sidewalls 24, the nail 64 penetrating the right sidewall 24 is caused to deflect from its initial path of penetration so that its point is harmlessly bent into a condition between the punctured sidewall 24 and one or more of the segments 52.

Accordingly, the tire carcass 20 of the embodiment of FIGS. 6-10 can be used in a safe and in a near-fully inflated and pneumatically stabilized condition after having been penetrated by a nail either in its tread region or in its sidewall region.

Although the embodiments of FIGS. 1 and 6 have been described as having the tabs 44 as part and parcel of the metal band 36 (and, thus, made of metal themselves), the tabs 44 may be made of elastomeric material capable of expanding sufficiently, without tearing or pulling free from the slots 42, to enable the band 36 to expand fully into contact with the crown region 48 upon tread or sidewall puncture. Of course, such elastomeric tabs would contract once the tire was repaired and the tube 34 was reinstated into its contracted normal condition. As an alternative to the elastomeric tabs, the metal band 36 could be surrounded by an elastomeric collar (not shown) that would permit the band to expand upon tread or sidewall puncture, yet would resist centrifugal growth and retain the band 36 in its normal contracted condition illustrated in FIGS. 1 and 6 as long as the tire is not punctured.

Having thus set forth the nature of the present invention, it will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. A pneumatic tire comprising a substantially toroidal-shaped carcass having a pair of bead-reinforced sidewall regions, a crown region annularly bridging said sidewall regions, and nail-deflecting means disposed internally of said carcass between said sidewall regions for deflecting a nail that punctures said crown region, said nail deflecting means including an annular inflatable inner tube capable of being inflated to a volume sufficient to engage with its exterior surface substantially the entire interior surface of said carcass and a puncture-proof, circumferentially expandible, but inextensible, pliable band disposed between said inner tube and said crown region, said band having overlapping opposite end portions with detent means on said end portions for maintaining the end portions of said band substantially immovable with respect to each other whereby said band is at a first predetermined circumferential magnitude encircling said tube in a first limit position with said tube being annularly spaced from the interior of said crown region when said tube is inflated to a predetermined inflation level and while said tire is puncture-free and has at least a first predetermined pressure level in the space between the carcass and the exterior of said inner tube, said first predetermined pressure level and said detent means cooperating with said band to maintain said inflated tube in said first limit position, said detent means alone being insufficient to maintain said inflated tube in said first limit position, said detent means being releasable upon puncture of the crown region with consequent loss of pressure in said space below the first predetermined pressure to permit said inner tube to expand beyond said first limit position to a second limit position governed by the interior surface of said crown region with consequential movement of the end portions of said band with respect to each other to expand said band into a circumferential expanded condition wherein said band makes substantial circumferential contact with the interior of said crown region.

2. A pneumatic tire as claimed in claim 1, wherein said inner-tube, when said tire is in said puncture free condition, has an outer axial extent that is in registry at least partially with the inner opposite bead-reinforced sidewall regions of said carcass.

3. A pneumatic tire as claimed in claim 1, including valve means for simultaneously inflating said inner tube and the interior of said carcass as chambers isolated from one another.

4. A pneumatic tire as claimed in claim 1, wherein said band surrounds the exterior of said inner-tube.

5. A pneumatic tire as claimed in claim 1, wherein said inner tube is made of an elastomeric material that is capable of being pneumatically inflated to fill the entire inner volume of said carcass at an inflation pressure of approximately fifteen pounds per square inch.

6. A pneumatic tire as claimed in claim 1 wherein said band is of such an elongate extent that the overlapping end portions remain in overlapping relation during expansion of said band from said first predetermined circumferential magnitude to said circumferential expanded condition.

7. A pneumatic tire as claimed in claim 1, wherein said band has opposite side edges and includes inextensible puncture proof segments interleaved with one another, extending around and secured to each side edge of said band, said segments overlapping one another by an amount sufficient to remain interleaved with one another during expansion of said band said first predetermined circumferential magnitude to said circumferential expanded condition.

* * * * *